(12) United States Patent
Hsiao et al.

(10) Patent No.: US 7,599,615 B2
(45) Date of Patent: Oct. 6, 2009

(54) MOTOR STRUCTURE WITH BUILT-IN LENS

(75) Inventors: Cheng-Fang Hsiao, Tu-Cheng (TW);
Wun-Chang Shih, Tu-Cheng (TW);
Ching-Hsing Huang, Tu-Cheng (TW);
Chien-Long Hong, Tu-Cheng (TW)

(73) Assignee: Foxconn Technology Co., Ltd.,
Tu-Cheng, Taipei Hsien (TW)

( * ) Notice: Subject to any disclaimer, the term of this patent is extended or adjusted under 35 U.S.C. 154(b) by 394 days.

(21) Appl. No.: 11/309,369

(22) Filed: Aug. 1, 2006

(65) Prior Publication Data
US 2007/0110421 A1 May 17, 2007

(30) Foreign Application Priority Data
Nov. 11, 2005 (CN) .................. 2005 1 0101237

(51) Int. Cl.
*G03B 3/10* (2006.01)
*H02K 37/12* (2006.01)

(52) U.S. Cl. ............... 396/133; 310/49 R; 310/90; 310/80; 359/824

(58) Field of Classification Search ............... 396/85, 396/72, 133, 529; 359/824, 825, 823; 348/360
See application file for complete search history.

(56) References Cited

U.S. PATENT DOCUMENTS

| | | | |
|---|---|---|---|
| 4,639,084 A * | 1/1987 | Kugioka | 359/824 |
| 5,471,100 A * | 11/1995 | Sakamoto et al. | 310/12 |
| 5,546,233 A * | 8/1996 | Imanari et al. | 359/696 |
| 6,766,110 B1 * | 7/2004 | Oshima et al. | 396/72 |
| 6,798,093 B2 * | 9/2004 | Aoshima | 310/49 R |
| 6,849,973 B2 * | 2/2005 | Kurosawa et al. | 310/49 R |
| 7,039,309 B2 * | 5/2006 | Hsiao | 396/85 |
| 2004/0124719 A1 * | 7/2004 | Aoshima et al. | 310/49 R |
| 2004/0165877 A1 | 8/2004 | Hsiao | |
| 2005/0264899 A1 * | 12/2005 | Manabe | 359/811 |
| 2006/0061223 A1 * | 3/2006 | Manabe | 310/80 |
| 2006/0061885 A1 * | 3/2006 | Ito et al. | 359/811 |
| 2006/0061890 A1 * | 3/2006 | Otaka et al. | 359/824 |

FOREIGN PATENT DOCUMENTS

CN         93227103.0      12/1993

OTHER PUBLICATIONS

Definition of integral (2000). Collins English Dictionary. London: Collins.*

* cited by examiner

*Primary Examiner*—W B Perkey
*Assistant Examiner*—Leon W. Rhodes
(74) *Attorney, Agent, or Firm*—Frank R. Niranjan

(57) ABSTRACT

A motor structure with a built-in lens includes a lens mount (10), a motor (30) received in the lens mount, and a lens unit (50) received in the lens mount and driven by the motor to telescopically move along an axial thereof. The motor includes a stator (32) and a rotor (34) being rotatably received in the stator. A narrow gap is defined between an inner surface of the stator and an outer surface of the rotor. A bearing layer (36) is filled in the gap of the motor to avoid swing of the rotor during rotation thereof. The lens unit threadedly engages with the rotor, whereby when the rotor rotates, the lens unit has a linearly telescopic movement relative to the lens mount.

4 Claims, 4 Drawing Sheets

MOTOR STRUCTURE WITH BUILT-IN LENS

FIELD OF THE INVENTION

The present invention relates generally to drive source of camera lens, and more particularly to a drive source with built-in camera lens.

DESCRIPTION OF RELATED ART

The traditional structure of autofocus camera lens affixes a drive motor on an outside of a camera lens mount and, through the connection of transmission parts, the drive motor drives the telescopic lens in telescopic motion. Since the drive motor is located at the outside of the camera lens mount, the drive motor requires extra transmission parts in the camera lens mount to drive the telescopic lens to move, which often encounters the following drawbacks.

Since the drive motor is affixed to the outside of the camera lens mount, the structure of the camera lens is asymmetrical, which affects the spatial disposition of the camera lens module consisting of the camera lens mount and the telescopic lens. The extra transmission parts, which drive the telescopic lens to move inside the camera lens mount, add cost and complexity to the camera lens module and increase the volume thereof.

SUMMARY OF THE INVENTION

According to a preferred embodiment of the present invention, a motor structure with a built-in lens includes a lens mount, a motor received in the lens mount, and a lens unit received in the lens mount and driven by the motor to telescopically move along an axial thereof. The motor includes a stator and a rotor being rotatably received in the stator. A narrow gap is defined between an inner surface of the stator and an outer surface of the rotor. A bearing layer is filled in the gap of the motor to avoid swing of the rotor during rotation thereof. The bearing layer is made of high abrasion resistant materials or self-lubricating materials. By this way, friction generated between the rotor and the bearing layer can be greatly reduced. The lens unit is threadedly engaged with the rotor. When the rotor rotates, the lens unit has a linearly telescopic movement relative to the motor mount by a guidance of a top cover. By the bearing layer, the motor can drive the lens unit to have stable and accurate movement.

Other advantages and novel features of the present invention will be drawn from the following detailed description of a preferred embodiment of the present invention with attached drawings, in which:

BRIEF DESCRIPTION OF THE DRAWINGS

Many aspects of the present motor structure can be better understood with reference to the following drawings. The components in the drawings are not necessarily drawn to scale, the emphasis instead being placed upon clearly illustrating the principles of the present motor structure. Moreover, in the drawings, like reference numerals designate corresponding parts throughout the several views.

DETAILED DESCRIPTION OF THE INVENTION

Figure 1:
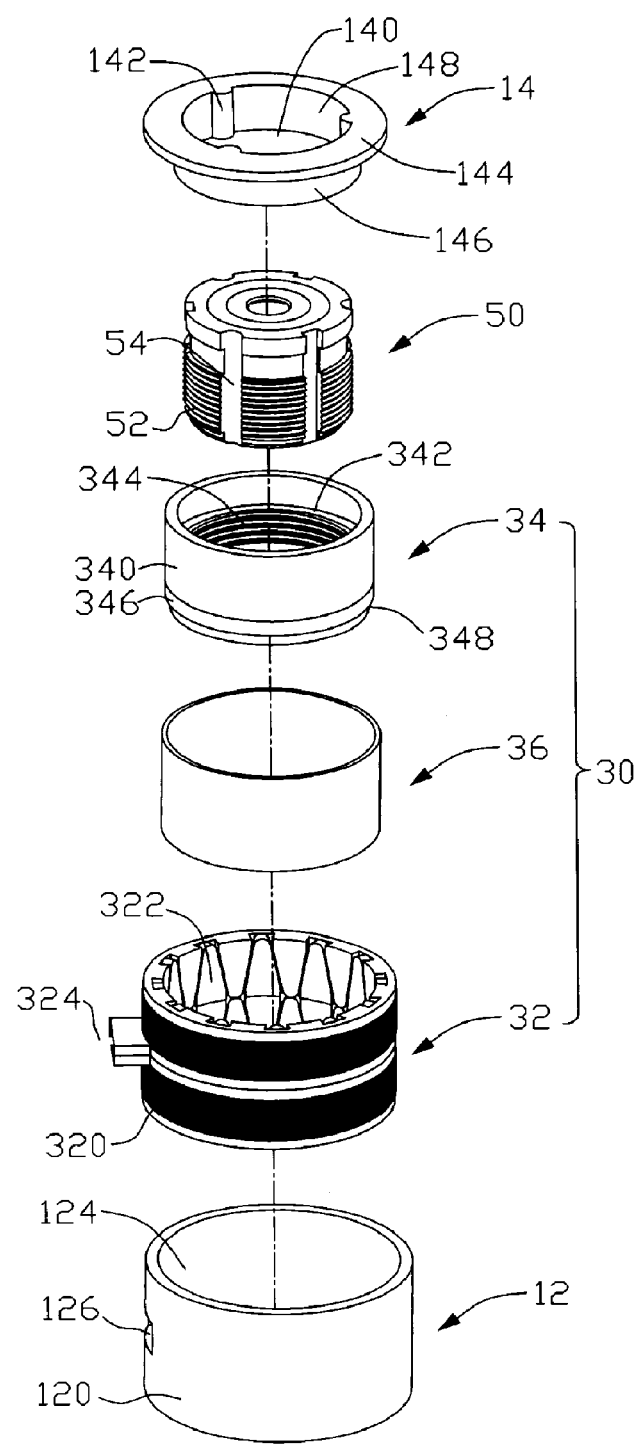
FIG. 1 is an isometric, exploded view of a motor structure with built-in lens in accordance with a preferred embodiment of the present invention.
Figure 2:
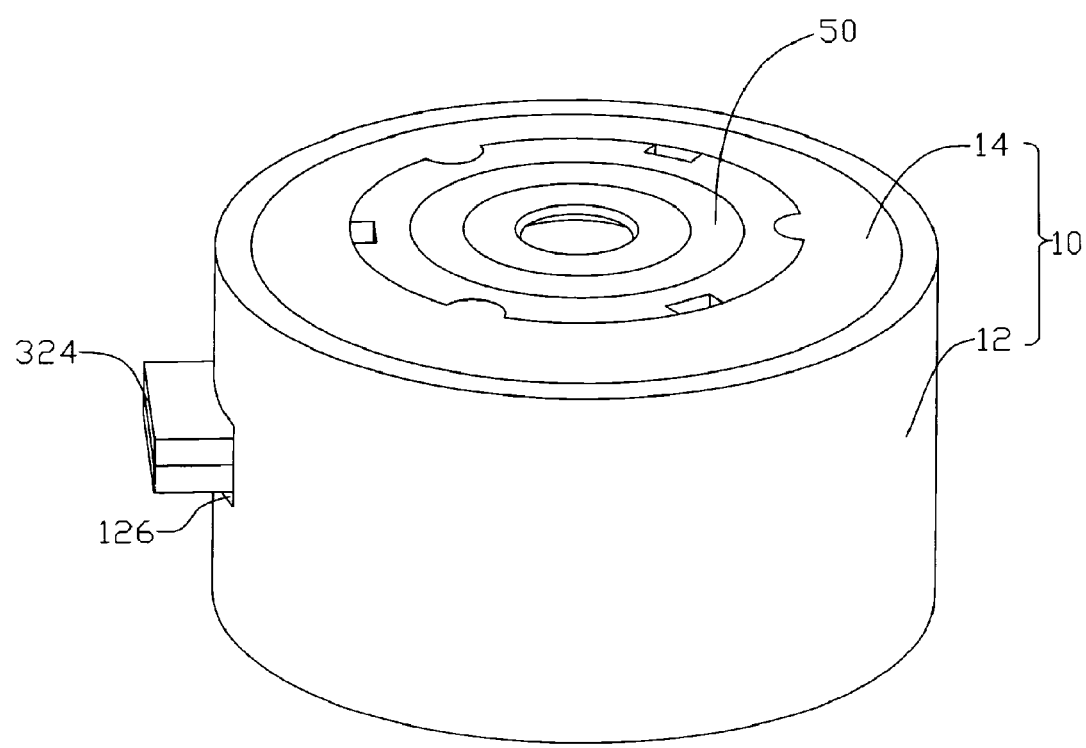
FIG. 2 is an assembled view of FIG. 1.
Figure 3:
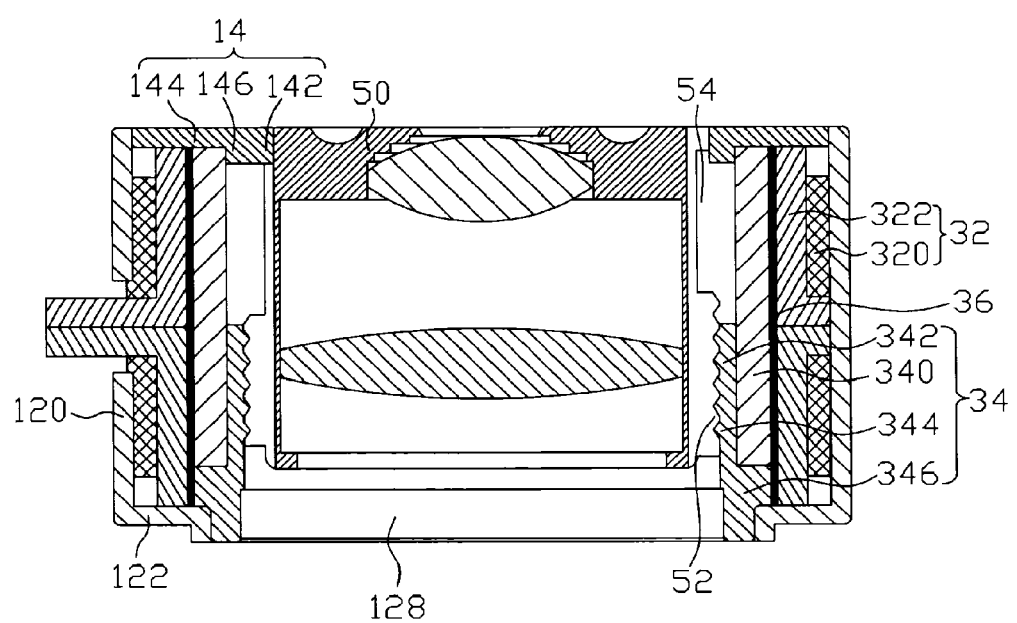
FIG. 3 shows a cross-sectional view of the motor structure with built-in lens of FIG. 2.

Referring to FIGS. 1 through 3, a motor structure with built-in lens according to a preferred embodiment includes a lens mount 10, a motor 30 received in the lens mount 10, and a lens unit 50 being drivable by the motor 30.

The lens mount 10 includes a bottom cover 12 and a top cover 14 located above and facing the bottom cover 12. The bottom cover 12 includes a ring-shaped basewall 122 and a sidewall 120 extending perpendicularly and upwardly from an outer-periphery of the basewall 122. An opening 124 is defined in the sidewall 120 above the basewall 122 for receiving the top cover 12. The top and bottom covers 14, 12 cooperatively define a column-shaped space (not labeled) therein when the top and bottom covers 14, 12 are assembled together. A passage 126 is defined in the sidewall 120 of the bottom cover 12 for extension of wires 324 of the motor 30 therethrough to connect the motor 30 with a power source (not shown). Circular hole 128 is defined in a central portion of the basewall 122 of the bottom cover 12.

The top cover 14 includes a ring-shaped main body 144. The main body 144 defines a through hole 140. The main body 144 has an outer diameter approximately the same as a diameter of the opening 124, and an inner diameter approximately the same as the diameter of the lens unit 50. An annular flange 146 extends downwardly from an inner circumference of the through hole 140 of the main body 144. Three protrusions 142 extend inwardly from an inner surface 148 of the top cover 14 and are equidistantly spaced from each other.

The motor 30 is received in the lens mount 10. The motor 30 is cylinder-shaped. An outer diameter of the motor 30 is approximately the same as an inner diameter of the sidewall 120 of the lens mount 10. An inner diameter of the motor 30 is smaller than a diameter of the circular hole 128 of the bottom cover 12, but larger than the diameter of the through hole 140 of the top cover 14. The motor 30 includes a stator 32, a rotor 34 being rotatably received in the stator 32, and a bearing layer 36 sandwiched between the stator 32 and rotor 34. The stator 32, the bearing layer 36, and the rotor 34 are cylinder-shaped. The stator 32 has an inner diameter larger than an outer diameter of the rotor 34. When the rotor 34 is mounted into the stator 32, a narrow gap is defined therebetween receiving the bearing layer 36 therein. In this embodiment, the bearing layer 36 is integrally formed with the stator 32 and fixedly adhered to an inner surface of the stator 32. The bearing layer 36 is made of high abrasion resistant materials or self-lubricating materials, such as PTFE (Polytetrafluoroethylene), MoS2 (Molybdenum Disulfide), etc., whereby during rotation of the rotor 34, the rotor 34 can have a low friction with the bearing layer 36. Alternatively, the bearing layer 36 can be adhered to an outer surface of the rotor 34 and thus rotate with the rotor 34 during operation of the motor 30. Also, the bearing layer 36 can be formed on both of the outer surface of the rotor 34 and the inner surface of the stator 32. Alternatively, the outer surface of the rotor 34 or the inner surface of the stator 32 can be made of the high abrasion resistant materials or self-lubricating materials. Thus during operation, friction generated between the outer surface of the rotor 34 and the inner surface of the stator 32 which contacts with the outer surface of the rotor 34 can be nearly ignored.

The stator 32 includes a stator core 322 having a plurality of poles and windings 320 wound around the stator core 322. The windings 320 electrically connect with the wires 324. The rotor 34 includes a shell 342 and a magnet 340 mounted around and adhered to an outer surface of the shell 342. The magnet 340 has an inner diameter approximately the same as an outer diameter of the flange 146 of the top cover 14. The shell 342 is approximately cylindrical-shaped. An annular-shaped bulge 346 extends radially and outwardly from a bottom end of the shell 342. The magnet 340 is arranged on the bulge 346 of the shell 342. A top end of the magnet 340 is higher than a top end of the shell 342. An annular step 348 is defined by an outer surface of the shell 342 below the bulge 346. An internal thread 344 is formed on an inner surface of the shell 342.

The lens unit 50 is linearly movably received in the hollow shell 342 of the rotor 34. An external thread 52 is formed in an outer surface (not labeled) of the lens unit 50 to threadedly engage with the internal thread 344 of the rotor 34. Six grooves 54 are defined in the outer surface of the lens unit 50. The grooves 54 are equidistantly spaced from each other in the outer surface 52 of the lens unit 50, and extend through the lens unit 50 along an axial direction thereof.

When assembled, the column-shaped space defined by the top cover 14 and the bottom cover 12 receives the motor 30 therein. The lens unit 50 is movably received in the hollow motor 30 with the external thread 52 screwing on the internal thread 344 of the rotor 34. The base wall 122 of the bottom cover 12 engages the step 348 below the bulge 346 of the shell 342 of the rotor 34. A lower portion of the shell 342 below the bulge 346 extends into the circular hole 128 and abuts an inner circumference of the circular hole 128 of the base wall 122. The top cover 14 engages with the top end of the magnet 340. A bottom surface of the main body 144 of the top cover 14 abuts a top surface of the magnet 340, whilst an outer surface of the flange 146 of the top cover 14 abuts an inner circumference of the top end of the magnet 340. Thus an axial movement of the motor 30 is blocked by the lens mount 10. Each protrusion 142 of the top cover 14 extends into a corresponding groove 54 of the lens unit 50 to guide the movement of the lens unit 50.

Figure 4:
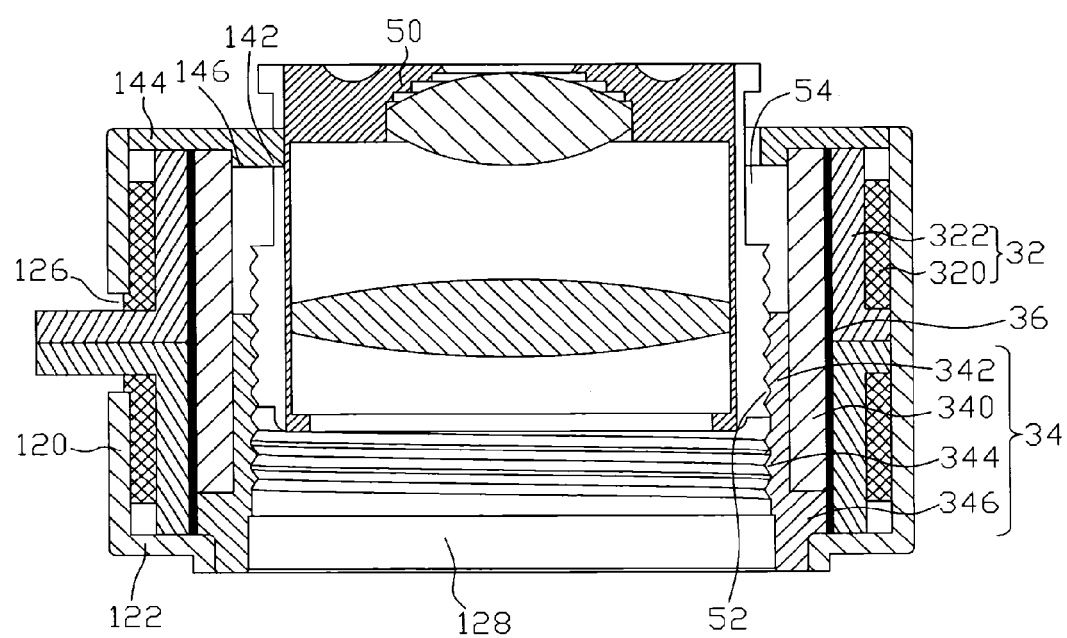
FIG. 4 is similar to FIG. 3, but showing a lens unit of the motor structure with built-in lens in telescopic motion.

Referring to FIG. 4, during operation, a current is applied to the windings 320 of the motor 30 through the wires 324. The rotor 34 is driven to rotate by the interaction of the alternating magnetic field established by the stator 32 and the magnetic field of the rotor 34. The rotation of the rotor 34 drives an axial telescopic movement of the lens unit 50 through the action between the internal thread 344 of the rotor 34 and the external thread 52 of the lens unit 50. Therefore the motor 30 acts as a stepper motor to drive the lens unit 50 into telescopic movement along the axial direction of the lens unit 50. During rotation of the rotor 34, the bearing layer 36 and the stator 32 are stationary. Due to the bearing layer 36 arranged between the rotor 34 and the stator 32, the rotor 34 and the stator 32 does not contact directly and friction between the rotor 32 and the stator 32 is avoided. As the bearing layer 36 is made of high abrasion resistant materials or self-lubricating materials, friction between the rotor 34 and the bearing layer 36 can be greatly reduced. On the other hand, since the bearing layer 36 fills in the gap between the rotor 34 and the stator 32, this can avoid swing of the rotor 34 during operation. Furthermore, the top cover 14 and the base wall 122 of the bottom cover 12 engage with top and bottom ends of the rotor 34 to limit the axial movement of the rotor 34. Thus, a stable and precise rotation of the rotor 34 can be obtained during operation of the motor 30. Because the motor 30 is directly built inside the cylindrical-shaped lens mount 10, a symmetrical ring shape structure is formed to improve the symmetry of the spatial disposition of the motor structure. On the other hand, by the fitting between the protrusions 142 and the grooves 54, rotation of the lens unit 50 during the telescopic movement thereof is avoided, resulting in stable telescopic axial movement of the lens unit 50. Thus, the motor 30 can drive the lens unit 50 into stable and accurate movement.

In this embodiment, the bearing layer 36 fills in the gap between the rotor 34 and the stator 32 to avoid swing of the rotor 34. The bearing layer 36 is cylinder-shaped and single piece. Alternatively, the bearing layer 36 can be several sections arranged on the inner surface of the stator 32 equidistantly spaced from each other. The sections cooperatively define a circumference supporting rotation of the rotor 34.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A motor structure with built-in lens comprising:
  a lens mount;
  a motor received in the lens mount, the motor comprising a stator and a rotor being rotatably received in the stator, the rotor comprising a cylindrical magnet having an outer surface facing an inner surface of the stator, a gap being defined between the inner surface of the stator and the outer surface of the magnet of the rotor;
  a bearing layer filled in the gap of the motor; and
  a lens unit received in the magnet and driven by the motor to telescopically move along an axial direction thereof;
  wherein the bearing layer is fixedly adhered to the outer surface of the magnet of the rotor.

2. A motor with built-in lens comprising:
  a bottom cover defining a space therein and a passage communicating with the space;
  a stator received in the space, having wires extending through the passage for connecting with a power source;
  a bearing layer received in the stator; a rotor having a cylindrical magnet received in the bearing layer and defining an inner thread, the bearing layer being sandwiched between and contacting with the stator and the cylindrical magnet;
  a lens unit received in the rotor, having an outer thread threadedly engaging with the inner thread of the rotor and axially extending grooves in an outer surface thereof; and
  a top cover fixed to the bottom cover and having protrusions fitting in the grooves of the lens unit; wherein when the stator is energized, the rotor rotates to drive the lens unit to move telescopically relative to the top cover;
  wherein the bearing layer is fixedly adhered to an outer surface of the magnet of the rotor.

3. The motor structure as claimed in claim 2, wherein the bearing layer is made of Polytetrafluoroethylene.

4. The motor structure as claimed in claim 2, wherein the bearing layer is made of Molybdenum Disulfide.

* * * * *

UNITED STATES PATENT AND TRADEMARK OFFICE
CERTIFICATE OF CORRECTION

PATENT NO. : 7,599,615 B2  Page 1 of 1
APPLICATION NO. : 11/309369
DATED : October 6, 2009
INVENTOR(S) : Hsiao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this

Twenty-eighth Day of September, 2010

David J. Kappos
*Director of the United States Patent and Trademark Office*